US012450968B2

(12) United States Patent
Greig

(10) Patent No.: US 12,450,968 B2
(45) Date of Patent: Oct. 21, 2025

(54) SYNTHETIC BANKNOTE DATA GENERATION USING A GENERATIVE ADVERSARIAL NETWORK WITH SPATIALLY COMPOSITED MULTISPECTRAL DATA

(71) Applicant: NCR Corporation, Atlanta, GA (US)

(72) Inventor: Alan Greig, Blairgowrie (GB)

(73) Assignee: NCR Corporation, Atlanta, GA (US)

( * ) Notice: Subject to any disclaimer, the term of this patent is extended or adjusted under 35 U.S.C. 154(b) by 446 days.

(21) Appl. No.: 17/854,875

(22) Filed: Jun. 30, 2022

(65) Prior Publication Data
US 2024/0005721 A1 Jan. 4, 2024

(51) Int. Cl.
G06V 10/58 (2022.01)
G06V 10/774 (2022.01)
G06V 10/82 (2022.01)
G07D 7/20 (2016.01)

(52) U.S. Cl.
CPC ......... *G07D 7/2083* (2013.01); *G06V 10/774* (2022.01); *G06V 10/82* (2022.01)

(58) Field of Classification Search
CPC ..... G07D 7/2083; G06V 10/82; G06V 10/774
See application file for complete search history.

(56) References Cited

U.S. PATENT DOCUMENTS

| 8,086,017 | B2 | 12/2011 | He et al. |
| 9,336,638 | B2 | 5/2016 | He et al. |
| 10,275,971 | B2 | 4/2019 | Greig |
| 10,475,846 | B2 | 11/2019 | Miao et al. |
| 2007/0140551 | A1* | 6/2007 | He .......................... G07D 7/206 382/137 |
| 2008/0069426 | A1* | 3/2008 | Liu ......................... G07D 7/202 382/137 |
| 2015/0213620 | A1* | 7/2015 | Ikemoto ................... G07D 7/17 348/131 |
| 2019/0109984 | A1* | 4/2019 | Good ..................... H04N 23/74 |
| 2020/0302149 | A1* | 9/2020 | Gottemukkula ....... G06N 3/084 |
| 2020/0302249 | A1* | 9/2020 | Liu .......................... G06N 3/08 |

(Continued)

FOREIGN PATENT DOCUMENTS

| WO | WO-2013131460 A1 * | 9/2013 | ................ H02P 6/21 |
| WO | WO-2013131560 A1 * | 9/2013 | ................ G01J 1/42 |

OTHER PUBLICATIONS

Sangwook Baek, et al. "Detection of counterfeit banknotes using multispectral images", Digital Signal Processing, vol. 782018, pp. 294-304, (Year: 2018).*

(Continued)

*Primary Examiner* — Chineyere Wills-Burns
*Assistant Examiner* — Lucius Cameron Gree Allen
(74) *Attorney, Agent, or Firm* — Notaro, Michalos & Zaccaria P.C.; John S. Economou

(57) ABSTRACT

A method for generating synthetic banknotes requires that a multispectral image be generated from a sample banknote. The multispectral image is processed to create a training image in a two-dimensional space. A generative adversarial network is trained using the training image. Synthetic banknotes are generated by seeding the trained generative adversarial network with random data. The synthetic banknotes may then be used to generate a banknote template for a currency validator.

5 Claims, 6 Drawing Sheets

(56) References Cited

U.S. PATENT DOCUMENTS

2021/0185246 A1* 6/2021 Bormet .................. H04N 23/11
2022/0309288 A1* 9/2022 Uljanovs ............. G06F 18/2431

OTHER PUBLICATIONS

T. Ali, S. Jan, A. Alkhodre, M. Nauman, M. Amin, M.S. Siddiqui "DeepMoney: counterfeit money detection using generative adversarial networks", PeerJ Computer Science, Sep. 2019 (Year: 2019).*

H. Shen, J. Chen, R. Wang and J. Zhang, "Counterfeit Anomaly Using Generative Adversarial Network for Anomaly Detection," in IEEE Access, vol. 8, pp. 133051-133062, 2020, doi: 10.1109/ACCESS.2020.3010612 (Year: 2020).*

Hashemi, M. Enlarging smaller images before inputting into convolutional neural network: zero-padding vs. interpolation. J Big Data 6, 98 (2019). https://doi.org/10.1186/s40537-019-0263-7 (Year: 2019).*

* cited by examiner

SYNTHETIC BANKNOTE DATA GENERATION USING A GENERATIVE ADVERSARIAL NETWORK WITH SPATIALLY COMPOSITED MULTISPECTRAL DATA

FIELD

This disclosure relates to a method of generating synthetic banknote data using a generative adversarial network with spatially composited multispectral data.

BACKGROUND

A currency validator is a device that determines whether banknotes are genuine or counterfeit. These devices may be found in many types of automated machines, including self-service terminals like automated teller machines, retail kiosks, supermarket self-checkout machines, and vending machines. An important part of the development process of any currency validator device is the collection of data from sample banknotes to create banknote templates. The currency validator uses the banknote template for a particular denomination to determine whether a particular sample banknote of that denomination is genuine or not. The banknote template creation process is both time-consuming and expensive because it requires multiple hundreds of banknotes for each denomination. This presents logistical challenges of sourcing, sorting, and securely storing many thousands of banknotes. Notwithstanding the expense and time required for acquiring the banknotes, each banknote must then be passed through the currency validator multiple times to acquire and store data therefrom. This step can be extremely time-consuming, often spanning many weeks of effort.

Accordingly, there is a need for a less costly and less time-consuming method for acquiring the data necessary for banknote templates for a currency validator device.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Conventional banknote template creation processes rely upon specific (large) quantities of banknotes which are scanned to create a robust banknote template, i.e., one which functions well within the associated currency validator in discriminating and validating between genuine and non-genuine (counterfeit) banknote samples. The method of the present disclosure generates a large number of synthesized banknotes from a small set of real-world examples of genuine banknotes. This means that the burden of the initial data collection activity is greatly reduced because of the smaller number of actual banknotes required and the consequent reduced time required for scanning and processing the sample banknotes. The method of the present disclosure contributes to a large cost-savings while also ensuring that a robust banknote template is generated.

The method of the present disclosure uses a generative adversarial network (GAN) to synthesize the banknote data required for generating a robust banknote template from a much smaller set of genuine banknotes than previously required. This is a class of machine learning whereby a network which has been trained with a set of data can then generate new data which has the same overall statistics as the training data. A GAN is used to identify regular patterns in input data (e.g., training images), and then create a model for generating output data (e.g., output images) that emulate characteristics of the training images in the original series of input data. Although the method of the present disclosure is particularly described with respect to the generation of synthetic banknote (i.e., currency) data sets, the method has broader application for any application which requires data-sets of images having multispectral data.

Figure 1A:
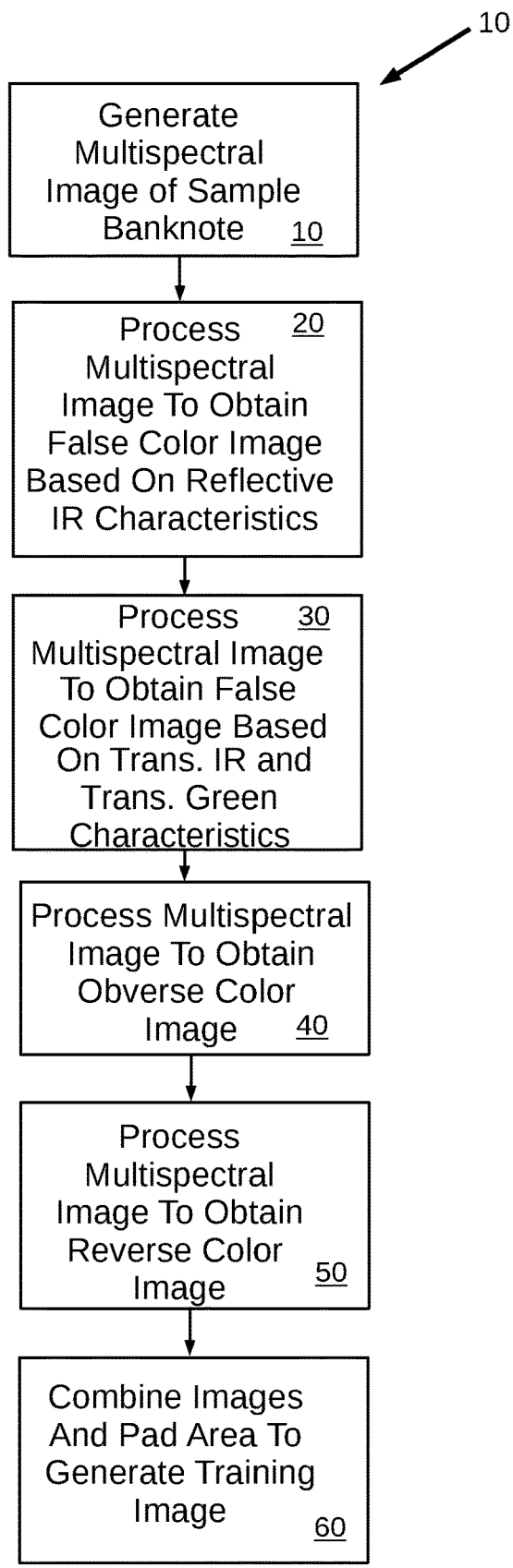
FIG. 1A is a flowchart showing the process of creating the training image according to an aspect of the present disclosure.
Figure 1B:
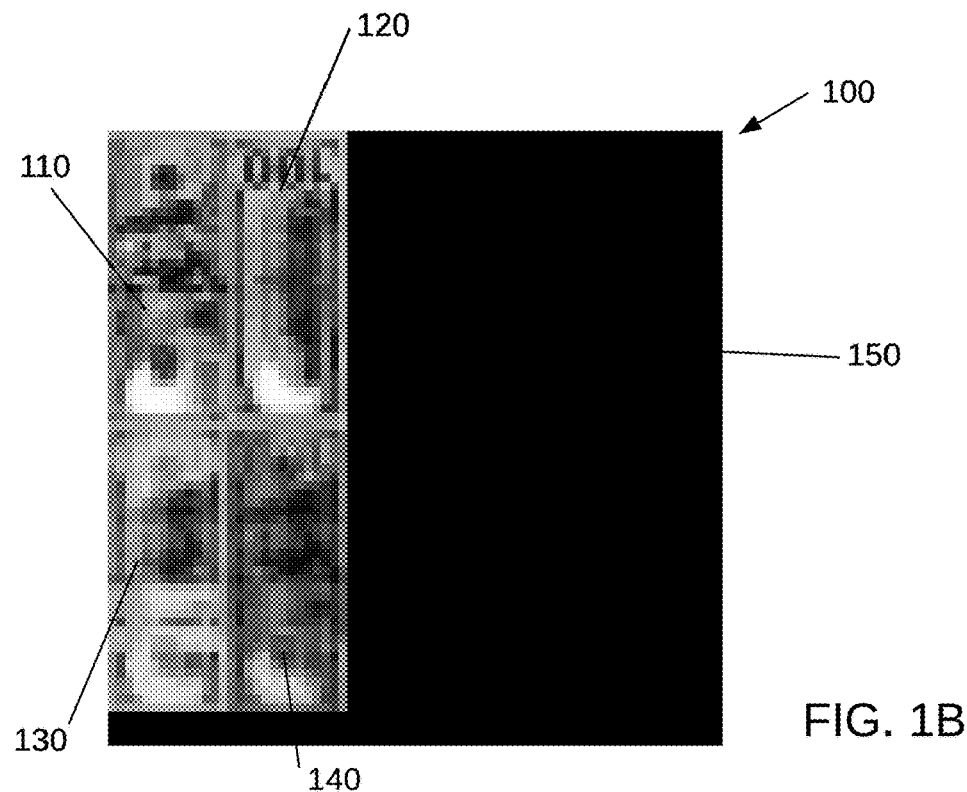
FIG. 1B is a training image for use with the method of the present disclosure.
Figure 1C:
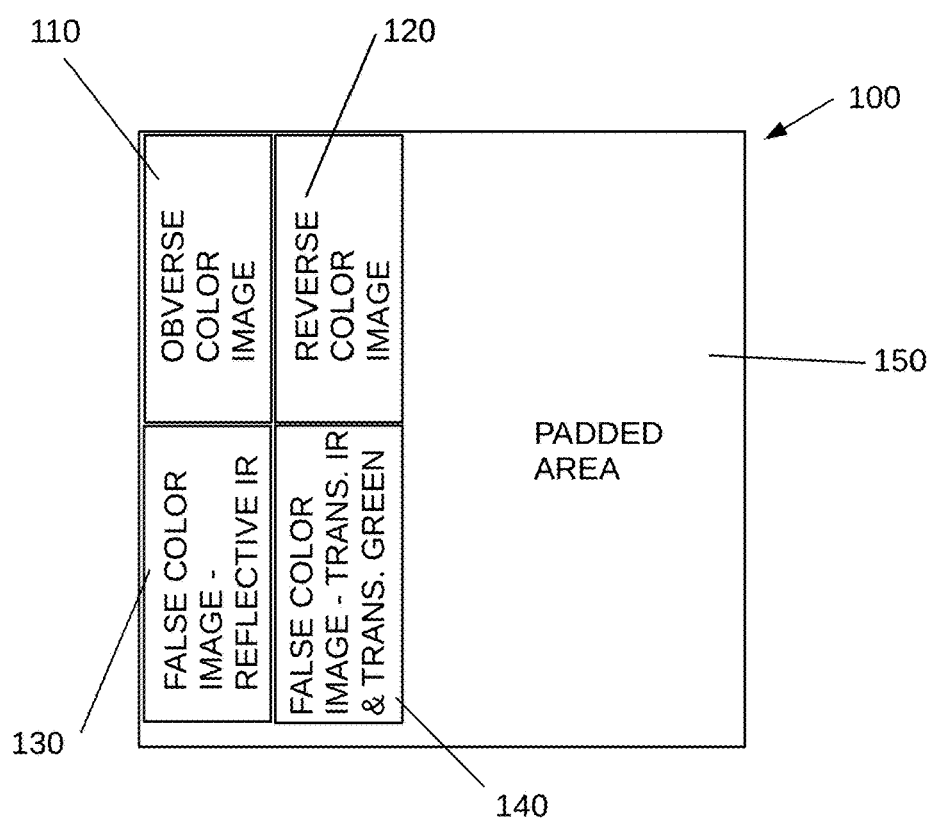
FIG. 1C is a block diagram showing the parts of the training image of FIG. 1B.

Typical GAN applications are based on two-dimensional (2D) color image data. However, banknote data is multi-spectral in nature with a number of visible and non-visible wavelengths of data comprising the makeup of the authenticatable features of the banknote. To apply a multispectral data set to a GAN, the multispectral data set (i.e., a multispectral image of a sample banknote) is processed by spatially compositing the various wavelengths (visible and non-visible) within the single 2D image and then the spatially composited data set is used to train the network. This processing is shown in the flowchart 10 of FIG. 1A. In a first step 10, a multispectral image of a sample banknote is generated, e.g., by scanning with an appropriate type of scanner. Next, at steps 20 and 30, two separate false color composites are created by processing the multispectral image, one for the reflective infrared wavelength data and one for the transmissive infrared and transmissive green wavelength data. Thereafter, at steps 40 and 50, the multi-spectral image is processed to generate an obverse color wavelength image and a reverse color wavelength image. Finally, at step 60, the created images are combined to create an interim image and a padded area is added to the interim image to create the final training image. An example of a training image 100 is shown in FIG. 1B, and a block diagram of the training image 100 is shown in FIG. 1C. The training image 100 includes four separate image portions 110, 120, 130, 140 created from a scan of a particular banknote. Image portion 110 is an obverse color image of the scanned banknote. Image portion 120 is a reverse color image of the scanned banknote. Image portion 130 is a false color image used to represent the reflective infrared (IR) aspects of the scanned banknote. Image portion 140 is a false color image used to represent the transmissive IR and transmissive green aspects of the scanned banknote. By processing the multispectral image in this manner, the final training image will be in the 2D space required by the GAN. Because a typical GAN operates on square 2D images, a padded area 150 added as necessary to ensure that training image 100 has dimensions that are equal on each side, i.e., training image 100 has a square shape.

Figure 2:
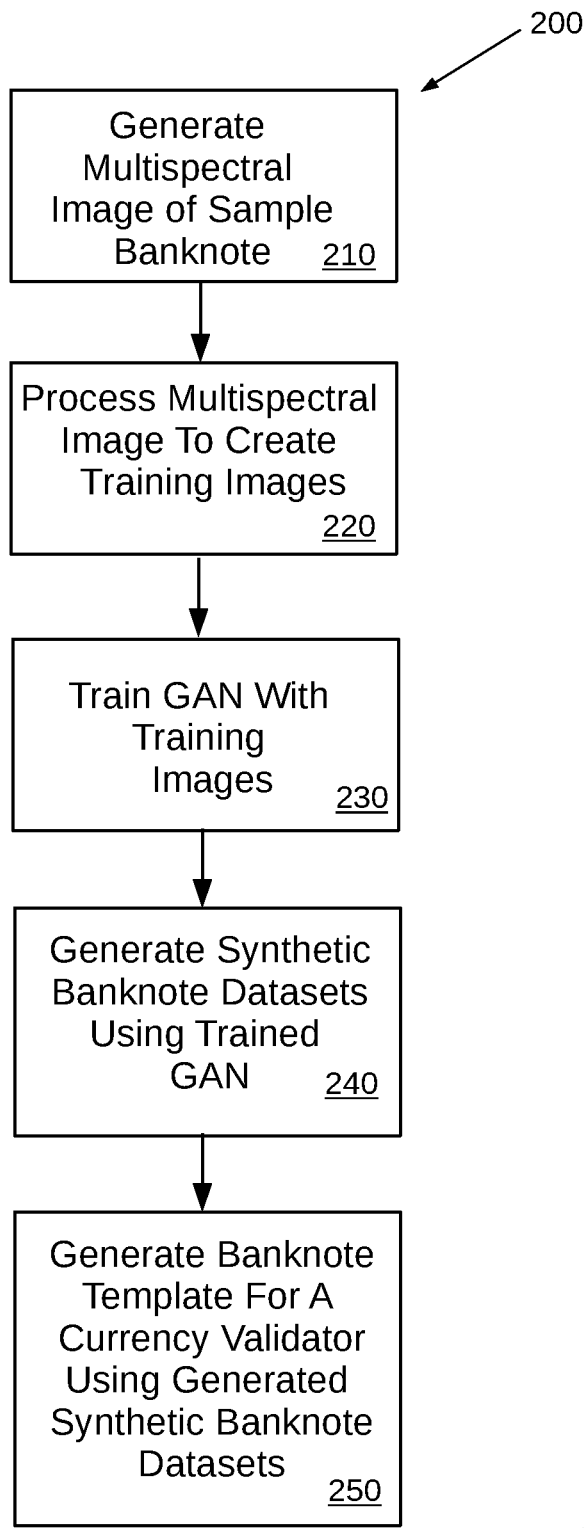
FIG. 2 is a flowchart of the method of the present disclosure.

The complete method of the present disclosure is shown in the flowchart 200 in FIG. 2. First, a multispectral image of a sample banknote is generated by scanning the sample banknote at step 210. Next, the multispectral image is processed to generate a number of training images of the sample banknote at step 220. Once a number of such training images are created, such as image 100 shown in FIG. 1B and depicted in FIG. 1C, an appropriate GAN network is trained using the training images to ensure the efficacy thereof at step 230. Thereafter, at step 240, the trained GAN network is seeded with random data in order to generate synthetic banknotes. Finally, at step 250, a banknote template for a currency validator is generated based upon the synthetic banknotes.

Figure 3A:
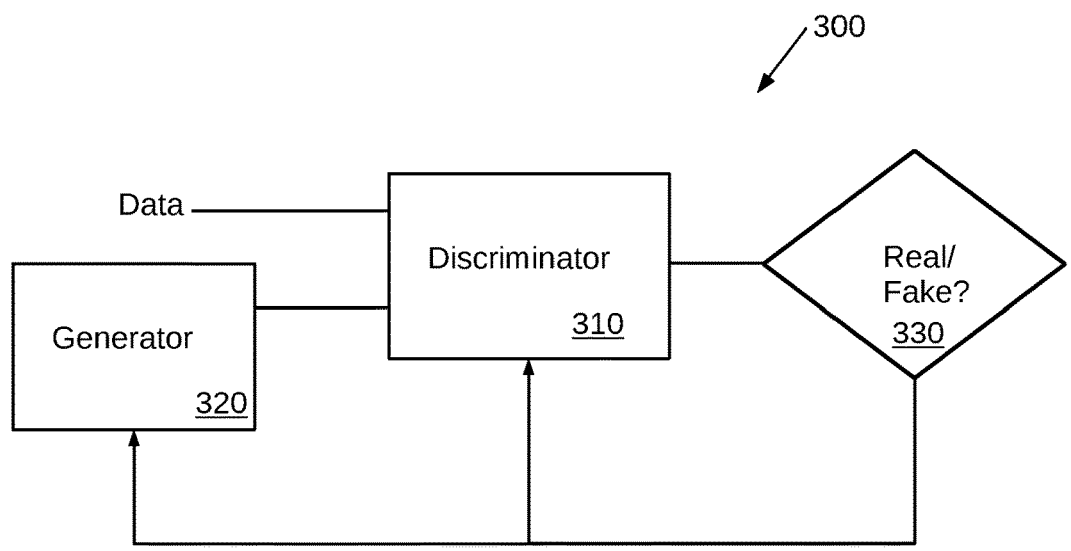
FIG. 3A is a diagram of a generative adversarial network.
Figure 3B:
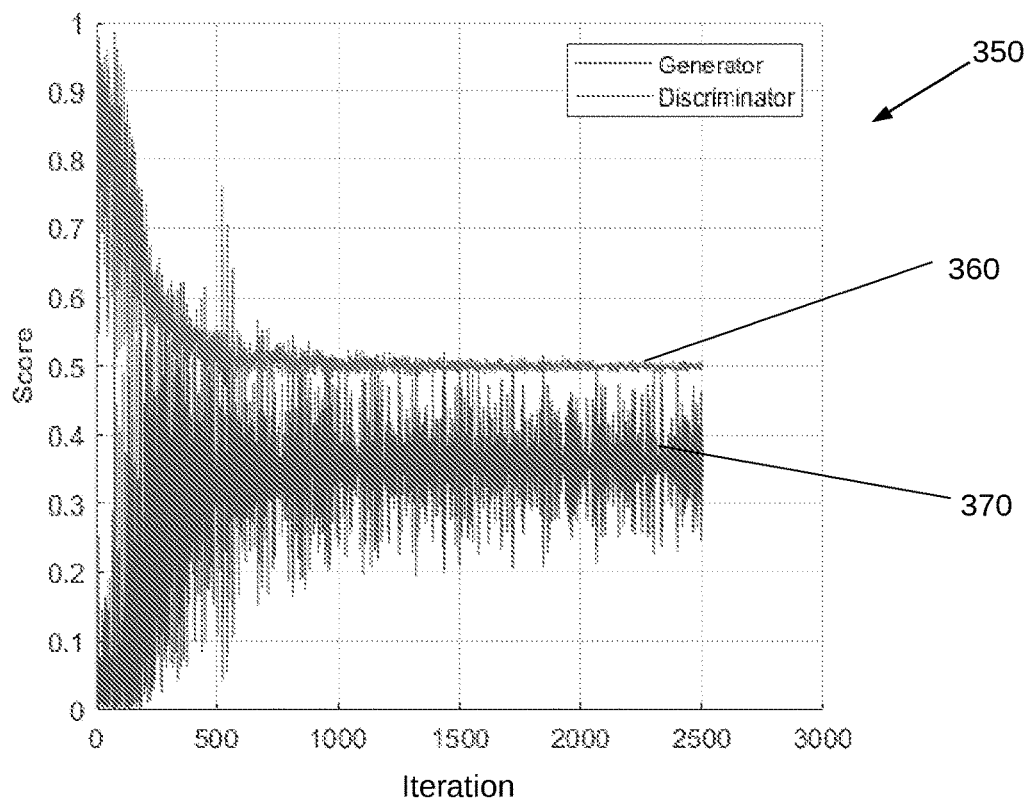
FIG. 3B is a chart showing the training of the generative adversarial network of the present disclosure.

A typical GAN 300 is shown in FIG. 3A. GAN 300 consist of two sub-networks. One sub-network is a generator model 320 that generates new samples. The other sub-network is a discriminator model 310 that attempts to determine whether a particular sample is from the original input data or is newly-generated. The generator model 320 attempts to generate images similar to the images in the training set, by initially creating a random image and then receiving a signal from the discriminator model 310 (shown by block 330) advising whether the discriminator finds the image to be real or fake. The training process for GAN 300 is iterative and continues until the discriminator model 310 is able to generate images having the same distribution (statistics) as the training images. The training of a GAN network using the image 100 is shown in the chart 350 of FIG. 3B. In chart 350, the output of the discriminator portion of the GAN network is shown by the plot 360 and the output of the generator portion of the GAN network is shown by the plot 370. As evident by the relative convergence of each plot 360, 370, the GAN network converges to a solution after less than 1000 iterations.

Figure 4:
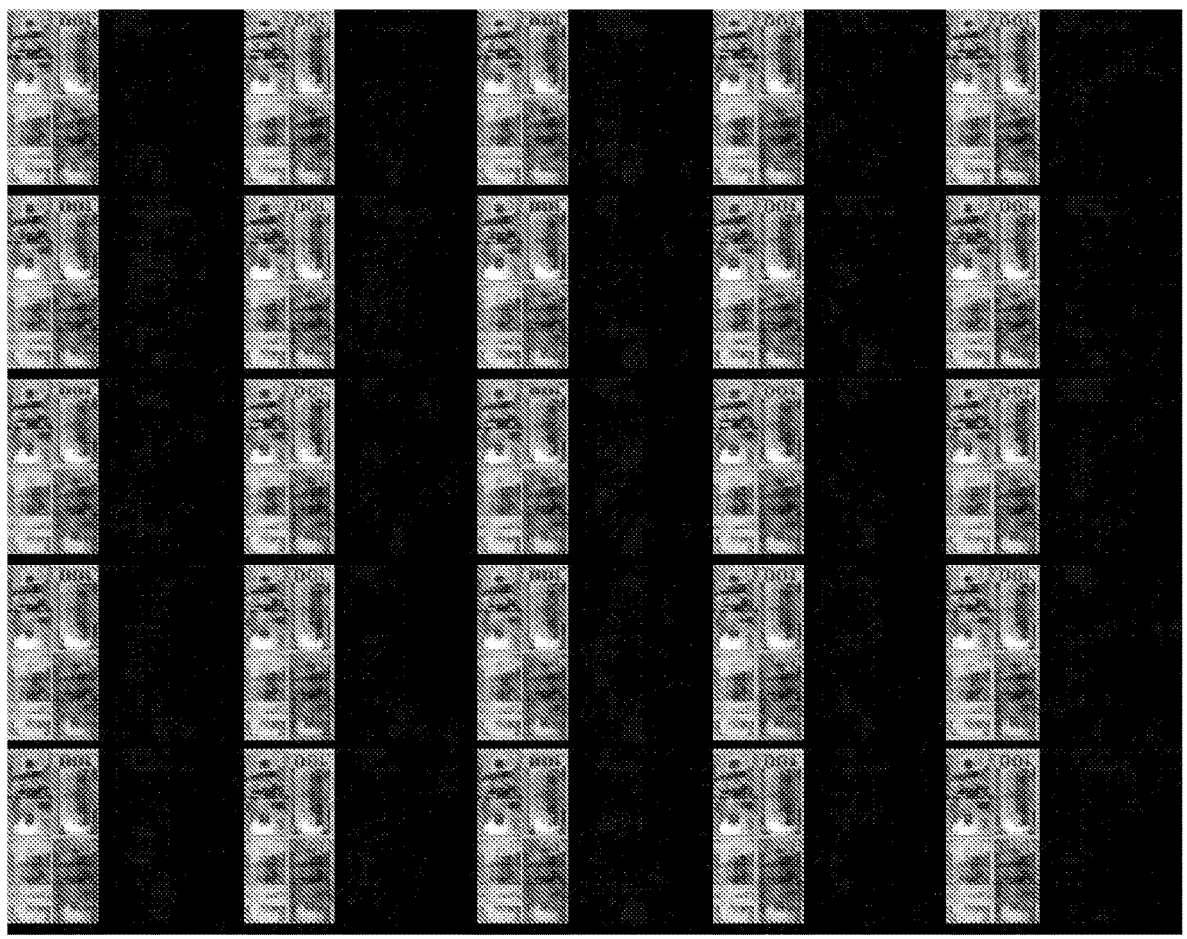
FIG. 4 is an image of synthetic banknotes created by the method of the present disclosure.
Figure 5:
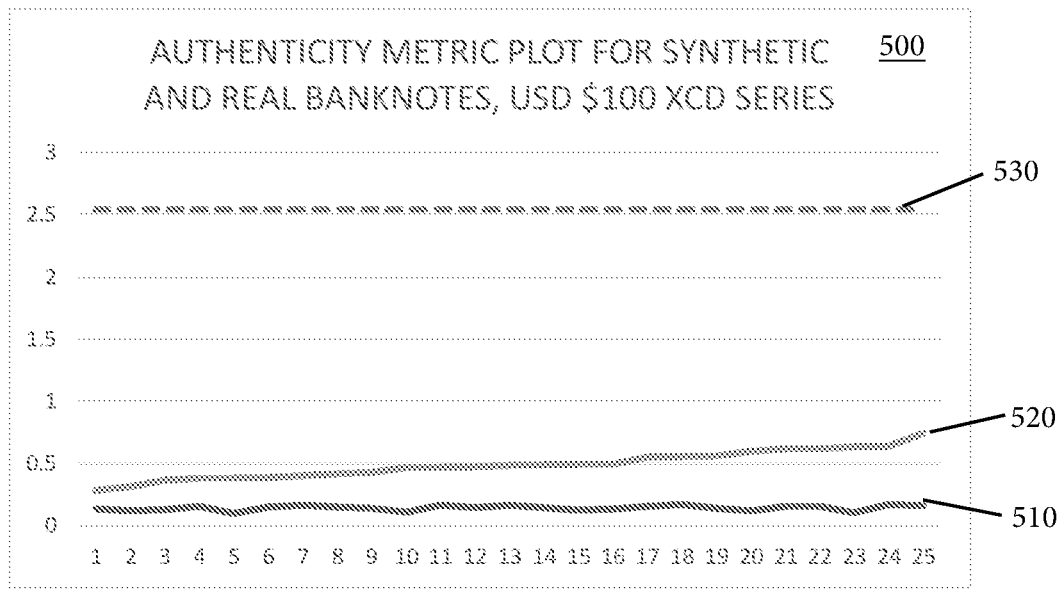
FIG. 5 is a chart showing an authenticity metric for a batch of synthetic banknotes created by the method of the present disclosure.

Once the GAN network is trained, random data is then used to seed the GAN network in order to generate new data sets (i.e., sets of images of synthetic banknotes). An example output image 400 from a trained GAN network is shown in FIG. 4. This image includes multiple sets of elements (i.e., synthesized banknotes) which are visually similar to the training image, but not identical, and which each have the same overall statistics as the training image. In order to assess the validity of these synthesized banknotes present in the example output image 400, each synthesized banknote within the example output image 400 was processed by a simulated currency validator, and an authenticity metric was generated based thereon. FIG. 5 is a chart 500 of this authenticity metric showing a plot 520 for a single batch of synthesized banknotes alongside a plot 510 of a batch genuine banknotes. Although the plot 520 of the absolute value of the metric is greater for the synthesized banknotes than the plot of the genuine banknotes, the value is still well within the expected range 530 for genuine notes (e.g., a threshold above which the particular banknote would be deemed non-genuine). The variation in plot 520 also demonstrates that the processing performed by the GAN network does not merely duplicate the data from the original training image.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method for generating a set of synthetic banknotes, comprising:
   generating a multispectral image of a sample banknote,
   processing the multispectral image to create a training image in a two-dimensional space, wherein processing the multispectral image to create a training image in a two-dimensional space comprises:
      generating a first false color image based on reflective infrared characteristics from the multispectral image,
      generating an obverse color image from the multispectral image,
      generating a reverse color image based from the multispectral image,
      generating a second false color image based on transmissive infrared and transmissive green characteristics from the multispectral image, and
      combining the first false color image, the obverse color image, the reverse color image, and the second false color image to be an interim version of the training image and then adding padding to the interim version of the training image so that the resultant training image has a square shape;
   training a generative adversarial network using the training image; and
   generating the set of synthetic banknotes by seeding the trained generative adversarial network with random data.

2. The method of claim 1, wherein the generative adversarial network consists of a generator model and a discriminator model.

3. A method for generating a banknote template for a currency validator, comprising:
   generating a multispectral image of a sample banknote,
   processing the multispectral image to create a training image in a two-dimensional space, wherein processing the multispectral image to create a training image in a two-dimensional space comprises:
      generating a first false color image based on reflective infrared characteristics from the multispectral image,
      generating an obverse color image from the multispectral image,
      generating a reverse color image based from the multispectral image,
      generating a second false color image based on transmissive infrared and transmissive green characteristics from the multispectral image, and
      combining the first false color image, the obverse color image, the reverse color image, and the second false color image to be an interim version of the training image and then adding padding to the interim version of the training image so that the resultant training image has a square shape;
   training a generative adversarial network using the training image;
   generating a set of synthetic banknotes by seeding the trained generative adversarial network with random data; and
   generating the banknote template from the set of synthetic banknotes.

4. The method of claim 3, wherein the generative adversarial network consists of a generator model and a discriminator model.

5. A method for generating a set of synthetic images, comprising:
- generating a multispectral image of a sample image,
- processing the multispectral image to create a training image in a two-dimensional space, wherein processing the multispectral image to create a training image in a two-dimensional space comprises:
  - generating a first false color image based on reflective infrared characteristics from the multispectral image,
  - generating an obverse color image from the multispectral image,
  - generating a reverse color image based from the multispectral image,
  - generating a second false color image based on transmissive infrared and transmissive green characteristics from the multispectral image, and
  - combining the first false color image, the obverse color image, the reverse color image, and the second false color image to be an interim version of the training image and then adding padding to the interim version of the training image so that the resultant training image has a square shape;
- training a generative adversarial network using the training image; and
- generating a set of synthetic images by seeding the trained generative adversarial network with random data.

* * * * *